US010399596B2

(12) United States Patent
Nakamura et al.

(10) Patent No.: US 10,399,596 B2
(45) Date of Patent: Sep. 3, 2019

(54) SENSOR DEVICE (71) Applicant: DENSO CORPORATION, Kariya, Aichi-pref. (JP)

(72) Inventors: Kouichi Nakamura, Kariya (JP); Katsuhiko Hayashi, Kariya (JP); Takaharu Kozawa, Kariya (JP); Shuji Kuramitsu, Kariya (JP); Masaya Taki, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 101 days.

(21) Appl. No.: 15/222,686

(22) Filed: Jul. 28, 2016

(65) Prior Publication Data
US 2017/0029022 A1 Feb. 2, 2017

(30) Foreign Application Priority Data
Jul. 31, 2015 (JP) ................. 2015-151814

(51) Int. Cl.
B62D 6/10 (2006.01)
B62D 5/04 (2006.01)
(Continued)

(52) U.S. Cl.
CPC ............ *B62D 6/10* (2013.01); *B62D 5/0409* (2013.01); *B62D 5/049* (2013.01); *B62D 5/0421* (2013.01);
(Continued)

(58) Field of Classification Search
None
See application file for complete search history.

(56) References Cited

U.S. PATENT DOCUMENTS

| 5,351,555 A * | 10/1994 | Garshelis | G01L 3/102 336/30 |
| 2005/0125124 A1* | 6/2005 | Nagase | B62D 5/046 701/41 |
| 2009/0030575 A1* | 1/2009 | Kleinau | B62D 5/0472 701/44 |

FOREIGN PATENT DOCUMENTS

| JP | 2000-055753 | 2/2000 |
| JP | 3551052 B2 | 8/2004 |

(Continued)

OTHER PUBLICATIONS

Javier Tordesillas, Oscillation annealing and driver/tire load torque estimation in Electric Power Steering Systems, Nov. 17, 2011, 7 pages.*

(Continued)

*Primary Examiner* — Tung S Lau
(74) *Attorney, Agent, or Firm* — Knobbe, Martens, Olson & Bear, LLP (57) ABSTRACT

A sensor device includes a plurality of sensor elements and an output circuit in one sensor part, and a correction value calculator in an ECU, which obtains output signals from the sensor part and calculates an offset correction value based on a plurality of signal values that correspond to a detection value when a calculability condition is satisfied. The ECU also includes a control calculator that performs a calculation based on the corrected signal values that have been corrected by the offset correction value. Therefore, the offset correction value is calculated in view of an aging and an accuracy variation of the components used in the sensor device. In such manner, the detection value is appropriately corrected for the calculation.

12 Claims, 7 Drawing Sheets

(51) Int. Cl.
*G01L 3/10* (2006.01)
*G01L 25/00* (2006.01)

(52) U.S. Cl.
CPC ......... *B62D 5/0463* (2013.01); *B62D 5/0487* (2013.01); *G01L 3/101* (2013.01); *G01L 25/003* (2013.01)

(56) References Cited

FOREIGN PATENT DOCUMENTS

| JP | 2005-331453 | 12/2005 | | |
| JP | 2009-137514 | 6/2009 | | |
| JP | 2014-010000 | 1/2014 | | |
| JP | 2015-010847 | 1/2015 | | |
| WO | WO 2010/144049 | * 12/2010 | ............. | B62D 5/065 |

OTHER PUBLICATIONS

Naser Mehrabi, Dynamics and Model-Based Control of Electric Power Steering Systems, 2014, 176 pages.*
Mitsubishi electric vol. 78/ Mar. 1997, 36 pages.*

* cited by examiner

SENSOR DEVICE

CROSS REFERENCE TO RELATED APPLICATION

The present application is based on and claims the benefit of priority of Japanese Patent Application No. 2015-151814, filed on Jul. 31, 2015, the disclosure of which is incorporated herein by reference.

TECHNICAL FIELD

The present disclosure generally relates to a sensor device.

BACKGROUND INFORMATION

Generally, a torque sensor may detect a steering torque. For example, in a patent document, Japanese Patent No. 3551052 (patent document 1), the temperature characteristics of the torque signal are corrected based on a torque signal at the time of 20 degrees Celsius and the torque signal at the time of 80 degrees Celsius.

In the patent document 1, since neither an aged deterioration nor the accuracy variation (i.e., dimension errors) of the parts is taken into consideration, there is a possibility that the torque signal cannot be appropriately corrected.

SUMMARY

It is an object of the present disclosure to provide a sensor device that is capable of appropriately correcting a detection value.

In an aspect of the present disclosure, the sensor device includes a sensor part and a controller. The sensor part includes a plurality of sensor elements that detects a physical quantity regarding a detection object (i.e., that yields detection values regarding a physical quantity of the detection object), and an output circuit that generates and outputs an output signal that includes sensor signals equivalent to the detection values from the plurality of sensor elements. The controller obtains the output signals from the sensor part.

The sensor part or the controller includes a correction value calculator that calculates at least one of (i) an offset correction value for correcting an offset error and (ii) a gain correction value for correcting a gain error based on a plurality of detection value equivalent values that correspond to, or are equivalent to, the detection values when a calculability condition is satisfied.

The controller includes a control calculator that performs calculation by using error corrected values derived from correction of the detection value equivalent values by at least one of the offset correction value and the gain correction value.

According to the present disclosure, at least one of the offset correction value and the gain correction value is calculated according to the aged deterioration and/or the accuracy variation of the parts, thereby enabling the control calculator to perform calculation by using the plurality of appropriately-corrected detection value equivalent values.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the sensor device in the present disclosure is described based on the drawings. Hereafter, throughout all the embodiments, the same numerals are assigned to the same/similar configuration, and the description of the same configuration is not repeated.

(First Embodiment)

The first embodiment of the present disclosure is shown in FIGS. 1-4.

Figure 1:
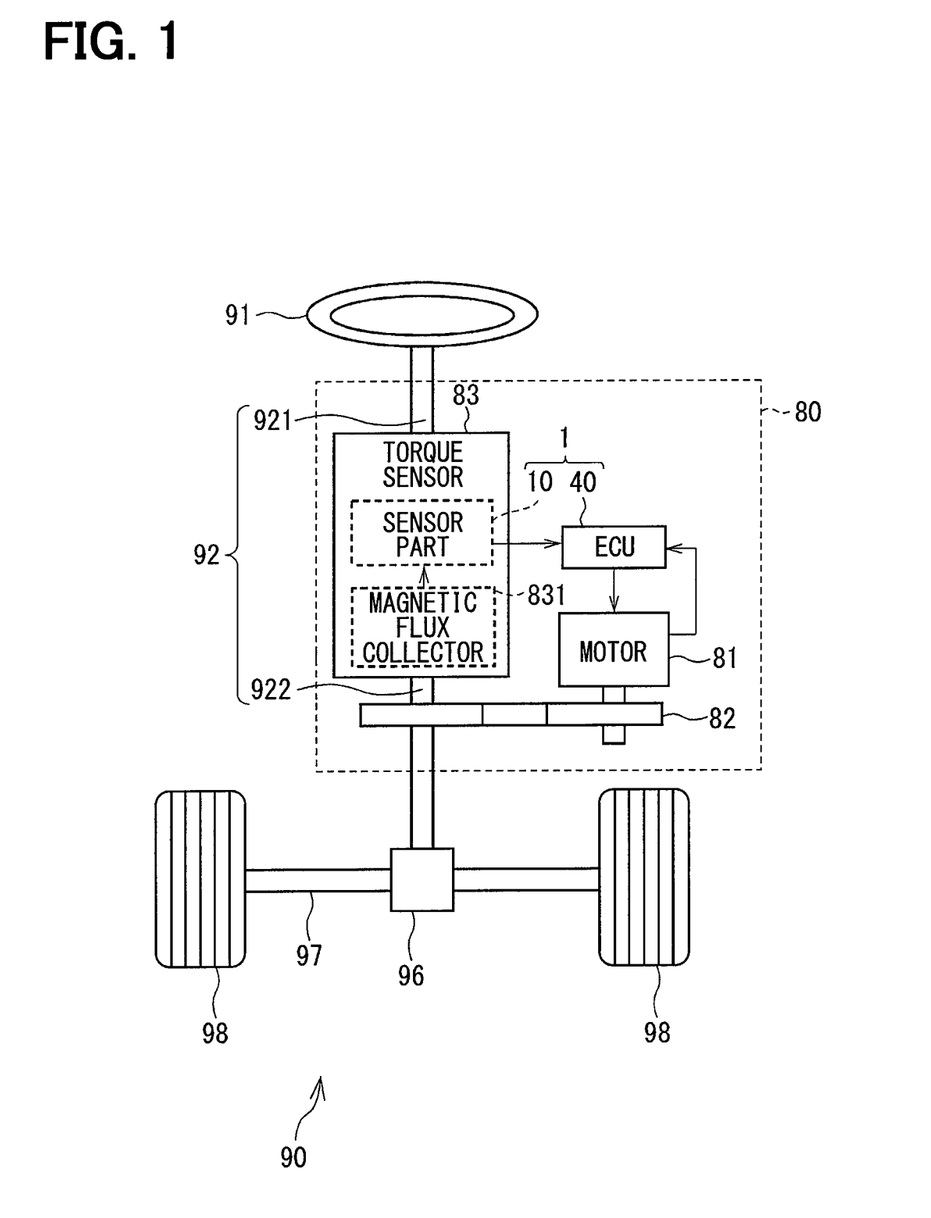
FIG. 1 is a block diagram of an electric power steering device in the first embodiment of the present disclosure.

As shown in FIG. 1, a sensor device 1 includes a sensor part 10 and an Electronic Control Unit (ECU) 40 that serves as a controller together with other components and is applied to, for example, an electric power steering device 80 for assisting the steering operation of a vehicle.

The entire configuration of a steering system 90 having the electric power steering device 80 is shown in FIG. 1.

A steering wheel 91 as a steering member is connected with a steering shaft 92. The steering shaft 92 has an input shaft 921 as a first shaft, and an output shaft 922 as a second shaft. The input shaft 921 is connected with the steering wheel 91. Between the input shaft 921 and the output shaft 922, a torque sensor 83 that detects a torque applied to the steering shaft 92 is disposed.

A pinion gear 96 is disposed at an opposite tip of the output shaft 922 relative to the input shaft 921. The pinion gear 96 engages with a rack shaft 97. A pair of wheels 98 is connected with both ends of the rack shaft 97 via tie rods etc.

When the driver rotates the steering wheel 91, the steering shaft 92 connected with the steering wheel 91 also rotate. The rotational movement of the steering shaft 92 is turned into the translational movement of the rack shaft 97 by the pinion gear 96, and the pair of wheels 98 is steered by an angle according to the amount of displacement of the rack shaft 97.

The electric power steering device 80 is provided with a motor 81 that outputs an assist torque that assists a steering operation of the steering wheel 91 by the driver, a speed reduction gear 82 that serves as a power transmission unit, a torque sensor 83, the ECU 40 or the like. Although the motor 81 and the ECU 40 have separate bodies in FIG. 1, they may be combined to have one body.

The speed reduction gear 82 reduces a rotation speed of the motor 81, and transmits the rotation to the steering shaft 92. That is, although the electric power steering device 80 of the present embodiment is what is called a "column assist type", the steering device 80 may also be a "rack assist type" in which the rotation of the motor 81 is transmitted to the rack shaft 97. In other words, the "drive object" is, in the present embodiment, the steering shaft 92, but it may also be the rack shaft 97.

The details of the ECU 40 are mentioned later.

The torque sensor 83 is disposed on the steering shaft 92, and detects a steering torque Ts based on a twist angle between the input shaft 921 and the output shaft 922.

The torque sensor 83 has a torsion bar (not illustrated), a magnetic flux collector 831, the sensor part 10 and the like.

The torsion bar coaxially connects the input shaft 921 and the output shaft 922 on the rotation axis, and converts a torque applied to the steering shaft 92 into a twist displacement.

The magnetic flux collector 831 has a multipolar magnet, a magnetic yoke, a magnetic collecting ring, etc., and is configured to have the magnetic flux density changed according to an amount of twist displacement and a twist displacement direction of the torsion bar. Since the torque sensor 83 is well-known in the art, the configuration of the torque sensor 83 is omitted from the description.

Figure 2:
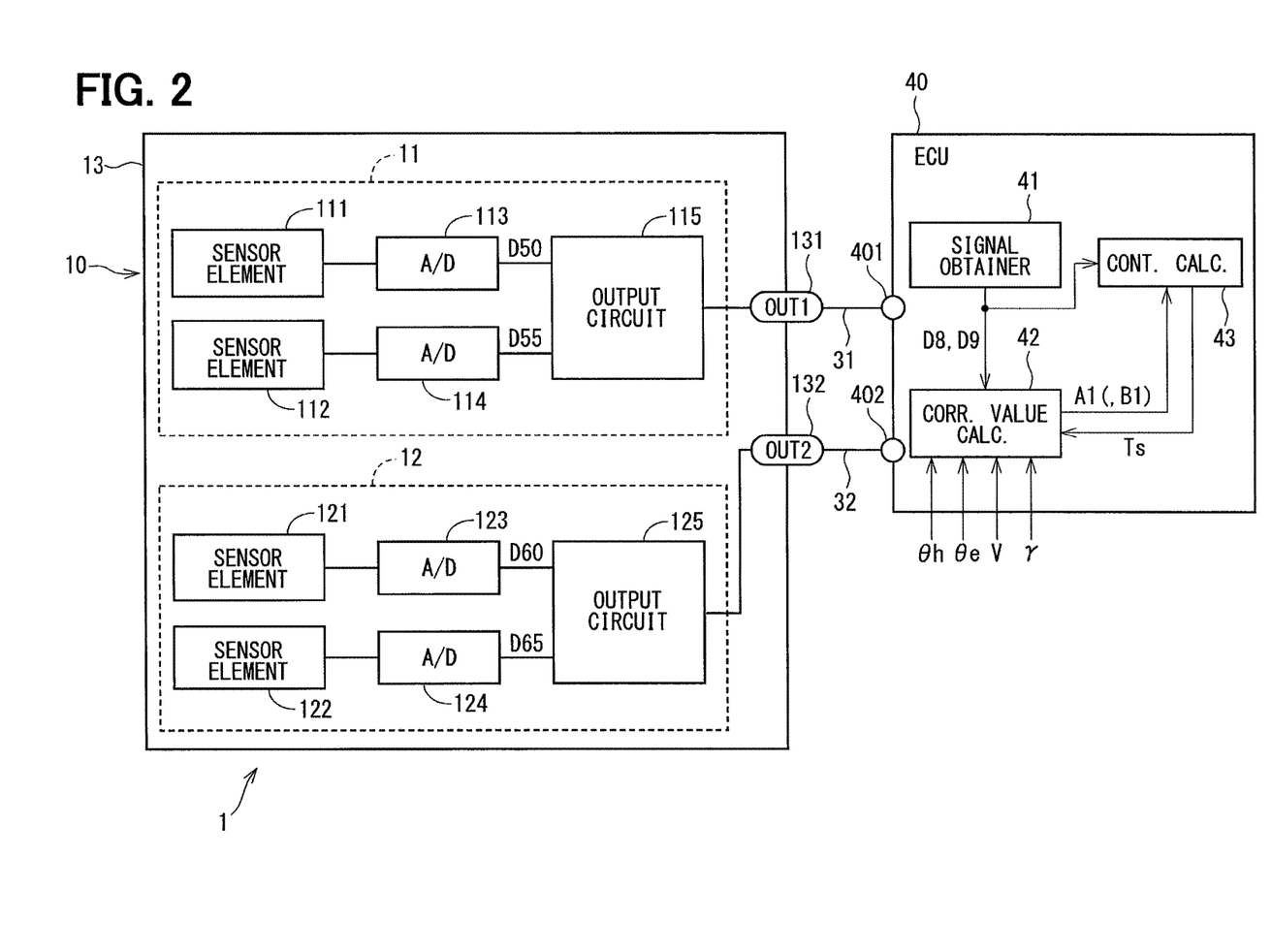
FIG. 2 is a block diagram of a sensor device in the first embodiment of the present disclosure.

As shown in FIG. 2, the sensor part 10 has a first signal generator 11, a second signal generator 12 or the like.

The first signal generator 11 has a main sensor element 111, a sub sensor element 112, Analog-to-Digital (A/D)-conversion circuits 113 and 114, and an output circuit 115.

The second signal generator 12 has a main sensor element 121, a sub sensor element 122, A/D-conversion circuits 123 and 124, and an output circuit 125.

The same number in the last digit of the 110 numbers and of the 120 numbers indicates the same configuration of those components, thereby the description is provided mainly for the 110 number components in the following.

Thus, the configuration of the first signal generator 11 is mainly discussed in the following, and the description about the second signal generator 12 is kept to be brief.

The main sensor element 111 and the sub sensor element 112 are, respectively, a magnetism detection element that detects the magnetic flux of the magnetic flux collector 831. The sensor elements 111 and 112 of the present embodiment are a Hall device.

Although the sensor elements 111, 112 are considered as a "main" and a "sub" in the present embodiment for the distinction of signal orders in a first output signal Sd1, the sensor elements 111, 112 are substantially the same components.

The A/D-conversion circuit 113 performs A/D-conversion of a detection value of the main sensor element 111. The A/D-conversion circuit 114 performs A/D-conversion of a detection value of the sub sensor element 112.

An A/D-conversion value of the detection value of the main sensor element 111 of the first signal generator 11 is designated as a first main detection value D50, and an A/D-conversion value of the detection value of the sub sensor element 112 of the first signal generator 11 is designated as a first sub detection value D55. Further, an A/D-conversion value of the detection value of the main sensor element 121 of the second signal generator 12 is designated as a second main detection value D60, and an A/D-conversion value of the detection value of the sub sensor element 122 of the second signal generator 12 is designated as a second sub detection value D65.

The output circuit 115 generates the first output signal Sd1 based on the first main detection value D50 and the first sub detection value D55.

The output circuit 125 generates a second output signal Sd2 based on the second main detection value D60 and the second sub detection value D65.

The output signals Sd1 and Sd2 are outputted to the ECU 40 from the sensor part 10 with a predetermined cycle by the SENT (Single Edge Nibble Transmission) communication, which is a kind of digital communications.

Further, the detection value of sensor elements 111, 112, 121, and 122 are updated with a cycle shorter than a signal cycle Ps of the output signals Sd and Sd2 (refer to FIG. 3), and the output signals Sd1 and Sd2 are generated by using the latest detection value.

The output timings of the output signals Sd1 and Sd2 from the sensor part 10 to the ECU 40 may be the same, or may be different.

For example, by shifting the output timings of the output signals Sd1 and Sd2 by the half cycle of the signal cycle Ps, the output signals Sd1 and Sd2 are obtained for every half cycle of the signal cycle Ps in turns by the ECU 40. Thereby, the transmission speed on appearance is improved.

The first signal generator 11 and the second signal generator 12 are enclosed in a sealed part 13. The sealed part 13 has communication terminals 131 and 132.

The communication terminal 131 is connected with a signal obtain terminal 401 of the ECU 40 by a first communication line 31, and the communication terminal 132 is connected with a signal obtain terminal 402 of the ECU 40 by a second communication line 32.

The first communication line 31 is used for the output of the first output signal Sd1, and the second communication line 32 is used for the output of second output signal Sd2.

The details of the output signals Sd1 and Sd2 are mentioned later.

The ECU 40 is constituted mainly as a microcomputer with other components, and performs various calculations and data processings.

Each process in the ECU 40 may be implemented as a software process by executing the program memorized in advance by a Central Processing Unit (CPU), and/or may be a hardware process by a dedicated electronic circuit.

The ECU 40 has a regulator (not illustrated). The regulator adjusts a voltage supplied from a battery (not illustrated) to a predetermined voltage. The adjusted voltage is used in the ECU 40, and is supplied to the sensor part 10.

The sensor part 10 is connected with a ground via the ECU 40.

The ECU 40 has a signal obtainer 41, a correction value calculator 42, and a control calculator 43 respectively as a functional block.

The signal obtainer 41 obtains the output signals Sd1 and Sd2 from the sensor part 10.

The correction value calculator 42 calculates at least one of an offset correction value A1 and a gain correcting value B1 based on a detection value equivalent value, which is a value based on a sensor signal included in the output signals Sd1 and Sd2. According to the present embodiment, the correction value calculator 42 calculates the offset correction value A1.

The correction value calculator 42 receives an input of, for example, a steered angle $\theta h$ of the steering wheel 91, an electrical angle $\theta e$ of the motor 81, the steering torque Ts, a vehicle speed V, a yaw rate $\gamma$, and the like.

The steered angle $\theta h$ of the steering wheel 91, the electrical angle $\theta e$, the steering torque Ts, the vehicle speed V, and the yaw rate $\gamma$ are respectively obtained from the wheel angle sensor, the rotational angle sensor, speed sensor, and the yaw rate sensor, none of which is illustrated, directly or via Controller Area Network (CAN).

Further, the correction value calculator 42 obtains the steering torque Ts that is calculated by the control calculator 43.

The control calculator 43 corrects a first signal value D8 and a second signal value D9 mentioned below with the offset correction value A1, and calculates the steering torque Ts by using the corrected first signal value D8 and the corrected second signal value D9.

The calculated steering torque Ts is used for the drive control of the motor 81. More practically, the control calculator 43 calculates a torque instruction value based on the steering torque Ts.

The ECU 40 controls the drive of the motor 81 by a well-known method, e.g., by a feedback process, based on the torque instruction value.

Figure 3:
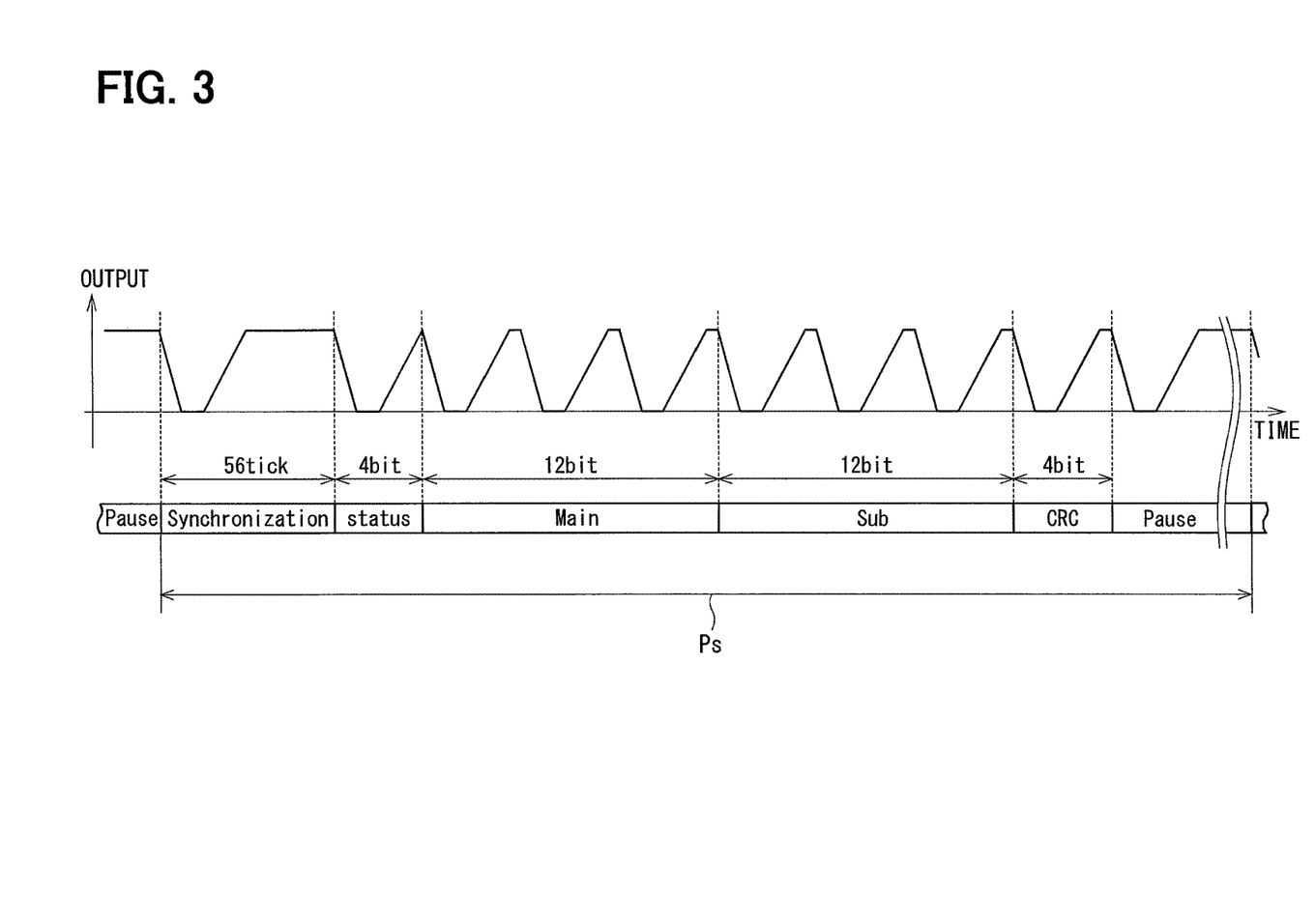
FIG. 3 is a time diagram of an output signal in the first embodiment of the present disclosure.

The communication frame of the first output signal Sd1 is described based on FIG. 3.

As shown in FIG. 3, the synchronization signal, the status signal, the sensor signal (i.e., the main signal and the sub signal in the present embodiment), the CRC signal, and the pause signal are included in the first output signal Sd1, and these signals are outputted as a series of signals in the presently written order. The number of bits of each signal shown in FIG. 3 is an example, and may be changed according to the telecommunications standard or the like. The data in SENT communication is represented by a time width between a falling edge of one signal and a falling edge of the next signal. Further, in the present embodiment, the signal cycle Ps is defined as a period from a start of the output of the synchronization signal to a start of the output of the next synchronization signal.

The synchronization signal is a signal for synchronizing the clock of the sensor part 10 and the clock of the ECU 40, and is set to 56 tick in the present embodiment. In the present embodiment, a correction coefficient is calculated based on the length of the synchronization signal, and each signal is corrected by using the correction coefficient concerned.

The status signal includes an update counter signal. The update counter signal is updated every time the output signal Sd1 is generated as shown in the following manner of a two-bit update counter signal, i.e., 00→01→10→11→00→01 - - - . After the update counter reaches the maximum value of "11", the update counter returns to the minimum value of "00" by an addition of +1.

By transmitting the information on the update counter, the ECU 40 is enabled to determine whether the two same data transmitted in a row is caused by the two same detection values or by the data adhesion error among them.

The main signal is a signal based on the first main detection value D50, and the sub signal is a signal based on the first sub detection value D55. Each of the main signal and the sub signal is represented by 3 nibbles (=12 bits).

In the present embodiment, the main signal and the sub signal are implemented as the nibble signal so that the output signal Sd1 is outputted to the ECU 40 by a SENT communication.

The main signal and the sub signal may also be represented by at least one nibble, which may be defined according to the communication standard.

The main signal and the sub signal in the present embodiment make a pair of an original signal and an inverted signal, i.e., one signal increases as the detection value increases and the other signal decreases as the detection value increases. The addition (i.e., the sum) of the original signal and the inverted signal is configured to have a preset addition value when both signals are normal. In the present embodiment, the main signal is treated as the original signal and the sub signal is treated as the inverted signal. In FIG. 3, the main signal and the sub signal are drawn in a similar manner for simplification, and for the ease of understanding.

In the present embodiment, when the sum of a value indicated by the main signal and a value indicated by the sub signal is different from the preset addition value, it is determined as a data abnormality. In such manner, based on the main signal and the sub signal, the data abnormality is detectable.

The CRC signal is a cyclic redundancy check signal for detecting a communication error, which has a signal length that is computed based on the main signal and the sub signal.

The pause signal is a signal that is outputted until the nest synchronization signal is outputted.

The synchronization signal, the status signal, the main signal, the sub signal, the CRC signal, and the pause signal are included in the second output signal Sd2, and these signals are outputted as a series of digital signals in the presently written order.

In the second output signal Sd2, the main signal is a signal based on the second main detection value D60, and the sub signal is a signal based on the second sub detection value D65.

Since the details of the communication frame of the second output signal Sd2 are the same as that of the first output signal Sd1, description of the communication frame of the second output signal Sd2 is omitted.

In the following description, a value indicated by the main signal of the first output signal Sd1 is designated as a first main signal value D80, and a value indicated by a converted-to-original (i.e., inverted) sub signal of the first output signal Sd1 is designated as a first sub signal value D85. Further, a value indicated by the main signal of the second output signal Sd2 is designated as a 25 second main signal value D90, and a value indicated by a converted-to-original (i.e., inverted) sub signal of the second output signal Sd2 is designated as a second sub signal value D95. The sub signal values D85 and D95 may simply be the sub signal values themselves, i.e., without converting values indicated by the sub signals to the original signals.

The first main signal value D80, the first sub signal value D85, the second main signal value D90, and the second sub signal value D95 are set up as a predetermined zero torque value Q0 when the steering torque Ts is equal to zero.

In the present embodiment, when the ignition switch of a vehicle, which is not illustrated, is turned ON and the electric power steering device 80 is started, the correction value calculator 42 calculates the offset correction value A1 that corrects the offset error. For the calculation of the offset correction value A1, a first signal value D8 which is a value based on the sensor signal of the first output signal Sd1, and a second signal value D9 which is a value based on the sensor signal of the second output signal Sd2 are used.

In the present embodiment, the first main signal value D80 and the first sub signal value D85 are averaged to serve as the first signal value D8, and the second main signal value D90 and the second sub signal value D95 are averaged to serve as the second signal value D9.

In the present embodiment, the first signal value D8 and the second signal value D9 correspond to the "detection value equivalent value."

Although the correction value calculator 42 obtains the signal values D8 and D9 in FIG. 2, the correction value calculator 42 may obtain the first main signal value D80, the first sub signal value D85, the second main signal value D90, and the second sub signal value D95, for calculating an average value of D80, D85, D90, D95.

Figure 4:
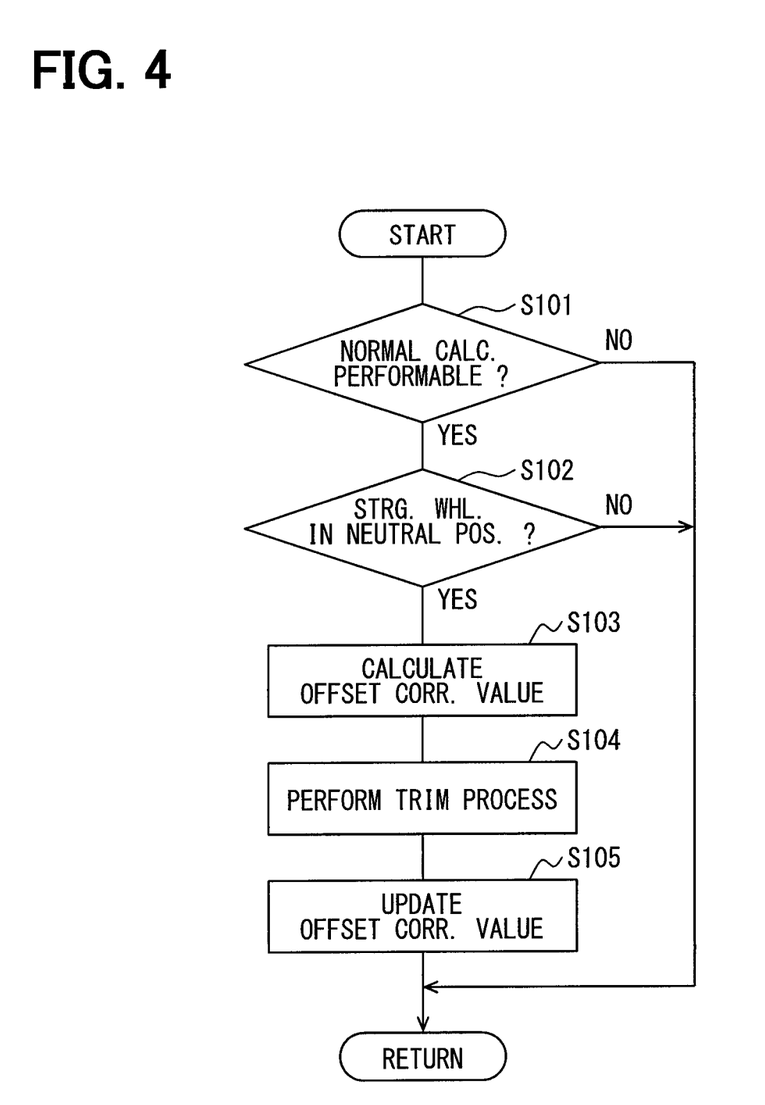
FIG. 4 is a flowchart of an offset correction value calculation process in the first embodiment of the present disclosure.

An offset correction value calculation process of the present embodiment is described based on a flowchart shown in FIG. 4. The offset correction value calculation process is performed in the ECU 40 at the time of starting of the electric power steering device 80.

In step S101, the correction value calculator 42 determines whether the correction value calculation is normally performable. Hereafter, the "step" of "step S101" etc. is simply abbreviated to the sign "S."

In the present embodiment, when (a) failure is not caused in the electric power steering device 80 and (b) there is no signal abnormality in the output signals Sd1 and Sd2, the correction value calculation is determined as normally performable. A failure determination process and a signal abnormality determination process of the electric power steering device 80 are performed separately. The signal abnormality includes, for example, a data adhesion abnormality detected based on the update counter, a data abnormality detected based on the data signal, a communication abnormality detected based on the CRC signal, and the like.

The following processes are not performed when it is determined that the correction value calculation is not normally performable, i.e., when failure is caused in the electric power steering device 80, or the signal abnormality is caused therein (S101:NO).

When it is determined that the correction value calculation is normally performable (S101:YES), that is, when failure is not caused in the electric power steering device 80, and the output signals Sd1 and Sd2 are normal, the process proceeds to S102.

In S102, the correction value calculator 42 determines whether the steering wheel 91 is in a neutral position. The neutral position of the steering wheel 91 is a position when the vehicle is traveling a straight path. Whether the steering wheel 91 is in the neutral position or not is determined based on the steered angle θh of the steering wheel 91, a rotation angle speed ωm of the motor 81, and the steering torque Ts. The rotation angle speed ωm is calculated from an electrical angle θe.

In the present embodiment, when (i) the steered angle θh is less than a steered angle determination threshold θth and (ii) the rotation angle speed ωm is less than an rotation angle determination threshold ωth and (iii) the steering torque Ts is less than a torque determination threshold Tth1, all of the steered angle θh, the rotation angle speed ωm, and the steering torque Ts are considered as equal to zero, and determines that the steering wheel 91 is in the neutral position.

The determination thresholds θth, ωth, and Tth1 may be set as a value, respectively, which substantiates that being smaller than the thresholds θh, ωm, and Ts is considered as being equal to zero.

Further, instead of using the rotation angle speed ωm of the motor 81, a steering angle speed ωh of the steering wheel 91 may be used.

The subsequent processes are not performed when it is determined that the steering wheel 91 is not in the neutral position (S102:NO). When it is determined that the steering wheel 91 is in the neutral position (S102:YES), the process proceeds to S103.

In the present embodiment, it is considered that "the calculability condition is satisfied" when an affirmative determination is made in S101 and S102.

In S103, the correction value calculator 42 calculates the offset correction value A1. The offset correction value A1 is calculated as a value, as shown in an equation (1), by dividing a difference between the first signal value D8 and the second signal value D9 by 2.

$$A1 = (D8 - D9)/2 \qquad \text{Equation (1)}$$

In S104, the correction value calculator 42 performs a trim process of the offset correction value A1, trimming, or restricting, the offset correction value A1. Hereafter, the offset correction value calculated in a current cycle of calculation is designated as a current value A1(k), and the offset correction value calculated in a previous cycle of calculation and outputted to the control calculator 43 is designated as a previous value A1(k−1).

When the absolute value of the current value A1(k) is greater than an offset correction upper limit Ac, the offset correction upper limit Ac or the previous value A1(k−1) is set to the offset correction value A1. In case that the offset correction upper limit Ac is set to the offset correction value A1, the positive/negative sign is taken from the current value A1(k).

When the absolute value of the difference between the current value A1(k) and the previous value A1(k−1) is greater than an offset difference threshold Ad, the previous value A1(k−1) is set to, i.e., used as, the offset correction value A1.

In S105, the correction value calculator 42 outputs the calculated offset correction value A1 to the control calculator 43. The control calculator 43 obtains the offset correction value A1 from the correction value calculator 42, and updates the offset correction value A1 used for the calculation to the latest value.

In the control calculator 43, by using the offset correction value A1, the first signal value D8 and the second signal value D9 are corrected, and a first post-correction signal value D8_a and second post-correction signal value D9_a are calculated (see an equation (2-1) and an equation (2-2)).

$$D8\_a = D8 - A1 \qquad \text{Equation (2-1)}$$

$$D9\_a = D9 - A1 \qquad \text{Equation (2-2)}$$

When a negative determination is made in S101 or S102, the calculation of the offset correction value A1 is not performed at the time of current starting of the electric power steering device 80. Therefore, the control calculator 43 performs an offset correction of the signal values D8 and D9 by using the previous value A1(k−1) or by using an initial value.

The control calculator 43 calculates the steering torque Ts based on the calculation values, e.g., based on the first post-correction signal value D8_a, the second post-correction signal value D9_a, the average value of the first post-correction signal value D8_a and the second post-correction signal value D9_a or the like.

In the present embodiment, for the calculation by the ECU 40, two signal values D8 and D9 are available. The correction value calculator 42 computes the offset correction value A1 by a relatively simple calculation by using two signal values D8 and D9. Thereby, an initial correction is omissible.

In the present embodiment, the correction value calculator 42 performs the calculation of the offset correction value A1 at the time of starting of the electric power steering device 80. Therefore, the offset correction value A1 is appropriately calculated in view of, or according to, the aged deterioration and/or the accuracy variation of the parts.

The control calculator 43 can calculate the steering torque Ts with sufficient accuracy by using the post-correction signal values D8_a, D9_a that are derived by correcting the signal values D8, D9 by using the above-calculated offset correction value A1.

As described in full details above, the sensor device 1 is provided with the sensor part 10 and the ECU 40.

The sensor part 10 has the plural sensor elements 111, 112, 121, and 122 and the output circuits 115 and 125. The sensor elements 111, 112, 121, and 122 detect the magnetic flux of the magnetic flux collector 831, i.e., the detection values regarding the physical quantity about the detection object.

The output circuit 115 generates and outputs the first output signal Sd1 including the sensor signals that are equivalent to the detection values of the sensor elements 111 and 112. The output circuit 125 generates and outputs the second output signal Sd2 including the sensor signals that are equivalent to the detection values of the sensor elements 121 and 122.

The ECU 40 obtains the output signals Sd1 and Sd2 from the sensor part 10.

The ECU 40 has the correction value calculator 42 that calculates, when the calculability condition is satisfied, the offset correction value A1 for correcting the offset error based on the plural signal values D8 and D9 that are the values equivalent to the detection values.

Further, the ECU 40 has the control calculator 43 that performs the calculation by using the post-correction signal values D8_a and D9_a that are derived by correcting the signal values D8 and D9 by the offset correction value A1. In the present embodiment, the control calculator 43 calculates the steering torque Ts by using the post-correction signal values D8_a and D9_a.

In the present embodiment, the offset correction value A1 is calculated as a value in view of or according to the aged deterioration and/or the accuracy variation of the parts. Thereby, the control calculator 43 can perform the calculation by using the signal values D8 and D9 that are appropriately corrected. Further, the initial correction performed at the time of manufacture is omissible.

The offset correction value A1 may be calculated based on a subtraction value of the two signal values D8 and D9. Thereby, the correction value calculator 42 is enabled to perform the calculation of the offset correction value A1 as a relatively easy and simple calculation.

The correction value calculator 42 is disposed in the ECU 40. Thereby, the information concerning a determination of the calculability condition needs not be transmitted to the sensor part 10.

The output circuits 115 and 125 output the output signals Sd1 and Sd2 to the ECU 40 by digital communications. By using the digital communications, the influence from (i) the error accompanying A/D-conversion or D/A-conversion and (ii) the noise at the time of communication can both be reduced as compared with the analog communications. Thereby, the accuracy of the calculation by the control calculator 43 is improved.

The sensor elements 111, 112, 121, and 122 are the magnetism detection elements that detect a change of the magnetic flux of the magnetic flux collector 831.

In the present embodiment, the sensor elements 111, 112, 121, and 122 detect the magnetic flux that changes according to the change of the steering torque Ts, and those elements 111, 112, 121, 122 are used for the torque sensor 83 of the electric power steering device 80. The control calculator 43 calculates the steering torque Ts by using the corrected signal values D8 and D9, which are already corrected. Thereby, the sensor device 1 can appropriately detect the steering torque Ts.

The steering torque Ts calculated under the influence of the offset error etc. may accordingly have errors, thereby the error may further be caused in the assist torque that is calculated based on the steering torque Ts, and the driver may suffer from a wrong feeling from such an error. Therefore, the error correction in the torque sensor 83 may need to be more accurate than other sensors such as a rotational angle sensor or the like.

In the present embodiment, the control calculator 43 can calculate the steering torque Ts appropriately by using the signal values D8 and D9 that are corrected by the offset correction value A1 in view of or according to the aged deterioration and/or the accuracy variation. That is, the sensor device 1 of the present embodiment is suitably and preferably used for the torque sensor 83. Thereby, the electric power steering device 80 of the present embodiment can appropriately output the assist torque based on the appropriately-calculated steering torque Ts.

The correction value calculator 42 considers, i.e., determines, that the calculability condition concerning the calculation of the offset correction value A1 is satisfied, and calculates the offset correction value A1 when (i) the electric power steering device 80 is started, and (ii) the steering wheel 91 is in the neutral position. Thereby, the offset correction value A1 is appropriately calculated.

The correction value calculator 42 restricts, or trims, the calculated offset correction value A1(k), when the absolute value of the calculated offset correction value A1 is greater than the offset correction upper limit Ac, or when the absolute value of the difference of the current value A1(k) and the previous value A1(k−1) is greater than an offset difference threshold Ad. In such manner, a steep change of the offset correction value A1 is prevented, and the calculation of an excessive offset correction value A1 is prevented.

(Second Embodiment)

Figure 5:
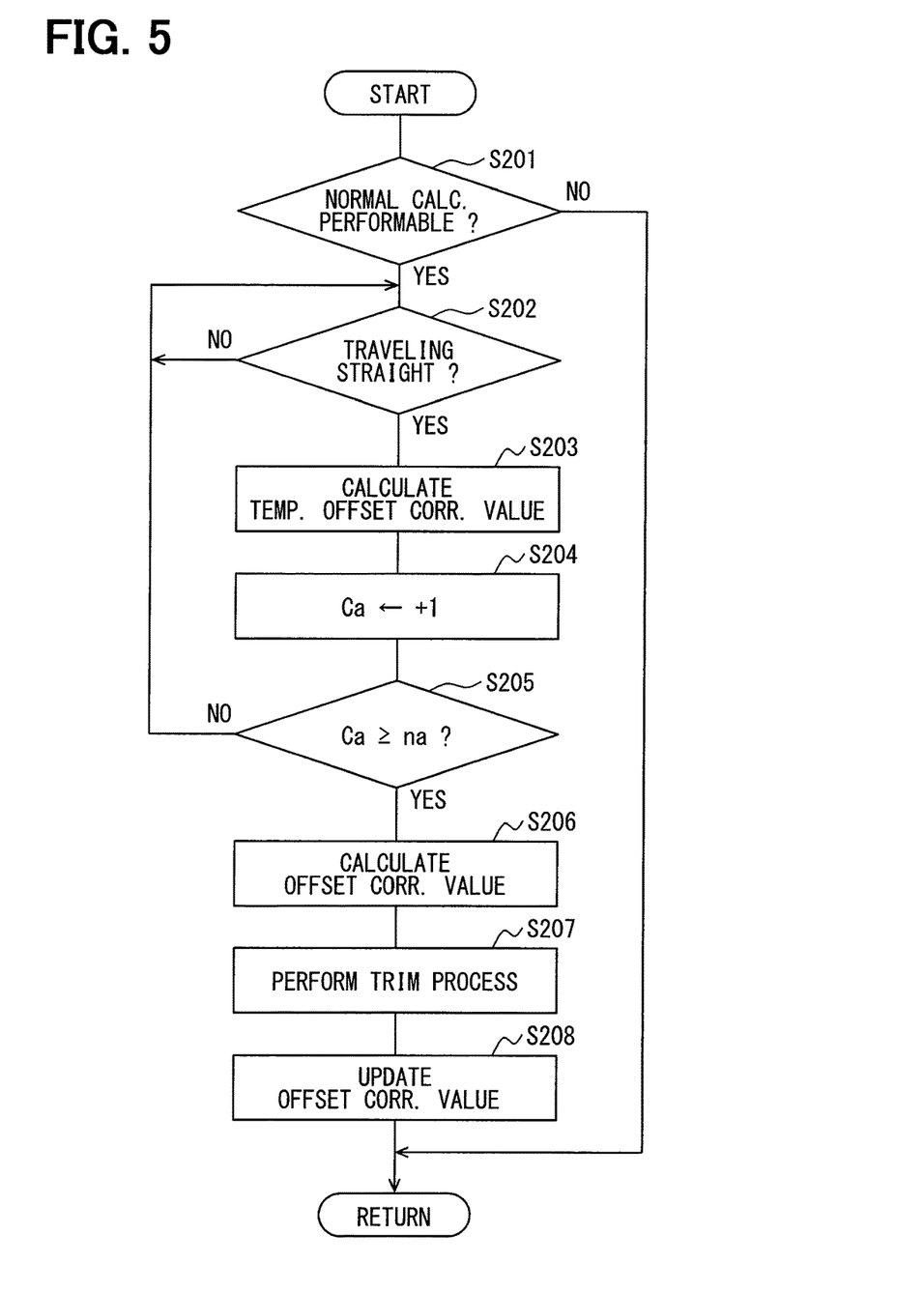
FIG. 5 is a flowchart of the offset correction value calculation process in a second embodiment of the present disclosure.

The second embodiment of the present disclosure is described based on FIG. 5.

In the present embodiment, the offset correction value calculation process is different from the above-mentioned embodiment. The description of the present embodiment is thus focused on such a difference. The offset correction value calculated at the time of starting of the electric power steering device 80 in the above-mentioned embodiment is calculated during a vehicle travel time in the present embodiment.

The offset correction value calculation process in the present embodiment is described based on a flowchart shown in FIG. 5. This process is performed in the ECU 40 during the vehicle travel time.

In S201, just like in S101 of FIG. 4, the correction value calculator 42 determines whether the correction value calculation is normally performable. For example, when the motor 81 has two winding groups and the inverter is provided for each of the two winding groups, even if one system breaks down, the drive of the motor 81 is continued with the other system. That is, even though failure is caused in the electric power steering device 80, the drive of the electric power steering device 80 may be continued by performing a backup control, e.g., by driving the motor 81 with only one of two systems in the device 80.

However, the offset correction value A1 may not be appropriately calculated by the backup control. Therefore, based on an assumption that the offset correction value A1 in the backup control may not be appropriate, the correction value calculation is not performed in the backup control.

Regarding the signal abnormality, the same as that of the above-mentioned embodiment applies.

When it is determined that the correction value calculation is not normally performable (S201:NO), the subsequent processes are not performed. When it is determined that the correction value calculation is normally performable (S201: YES), the process proceeds to S202.

In S202, the correction value calculator 42 determines whether the vehicle is traveling a straight path. In addition to a determination of the steering wheel being in the neutral position in the first embodiment, (i) a vehicle speed V of greater than a vehicle speed determination threshold Vth and (ii) a yaw rate γ of less than a yaw rate determination threshold γth are determined in the present embodiment for the straight travel determination.

The yaw rate determination threshold γth is a near-zero value that substantiates the determination that the yaw rate γ is considered as zero when smaller than such threshold γth in view of the calculation error.

The vehicle speed determination threshold Vth is set up as a value for a determination that the vehicle is traveling at a certain speed of non-zero value.

When it is determined that the vehicle is not traveling a straight path (S202:NO), the present determination process is repeated. In other words, when it is determined that the vehicle is not traveling a straight path, the calculation concerning the offset correction value A1 is not performed, i.e., the calculation of the value A1 is postponed until the vehicle travels a straight path. When it is determined that the vehicle is traveling a straight path (S202:YES), the process proceeds to S203. When an affirmative determination is made in S201 and S202, it is considered, in the present embodiment, that "the calculability condition is satisfied".

In S203, the correction value calculator 42 calculates a temporary offset correction value A1_t (refer to an equation (3)).

$$A1\_t=(D8-D9)/2 \qquad \text{Equation (3)}$$

The temporary offset correction value A1_t is stored in a storage part which is not illustrated. The value of the temporary offset correction value A1_t calculated in S203 is kept at least to S206 without being overwritten, i.e., by storing calculation-by-calculation values until the process of S206 is performed.

In S204, the correction value calculator 42 increments a counted value Ca of an offset correction counter.

In S205, the correction value calculator 42 determines whether the counted value Ca is equal to or greater than a number of trials threshold na. When it is determined that the counted value Ca is less than the number of trials threshold na (S205:NO), it is considered that the number of trials is insufficient, and the process returns to S202. When it is determined that the counted value Ca is equal to or greater than the number of trials threshold na (S205:YES), the process proceeds to S206.

In S206, the correction value calculator 42 calculates the offset correction value A1. In the present embodiment, the average value of the temporary offset correction values A1_t from the number of trials, i.e., for na times, is set to the offset correction value A1. Then, the counted value Ca is cleared, and the stored temporary offset correction values A1_t are erased.

The process of each of S207 and S208 is the same as the process of each of S104 and S105 in FIG. 4. Further, the correction of the signal values D8 and D9 by using the offset correction value A1 is performed in the same manner as the above-described embodiment.

In the present embodiment, the correction value calculator 42 determines that the calculability condition concerning the calculation of the offset correction value is satisfied, and calculates the offset correction value A1, when (a) the vehicle is traveling and (b) the vehicle is traveling a straight path. In such manner, the offset correction value A1 is calculated according to an ever-changing temperature or the like. Therefore, the signal values D8 and D9 are corrected in an appropriate manner.

The same effects as the above-mentioned embodiment are also achievable.

(Third Embodiment)

Figure 6:
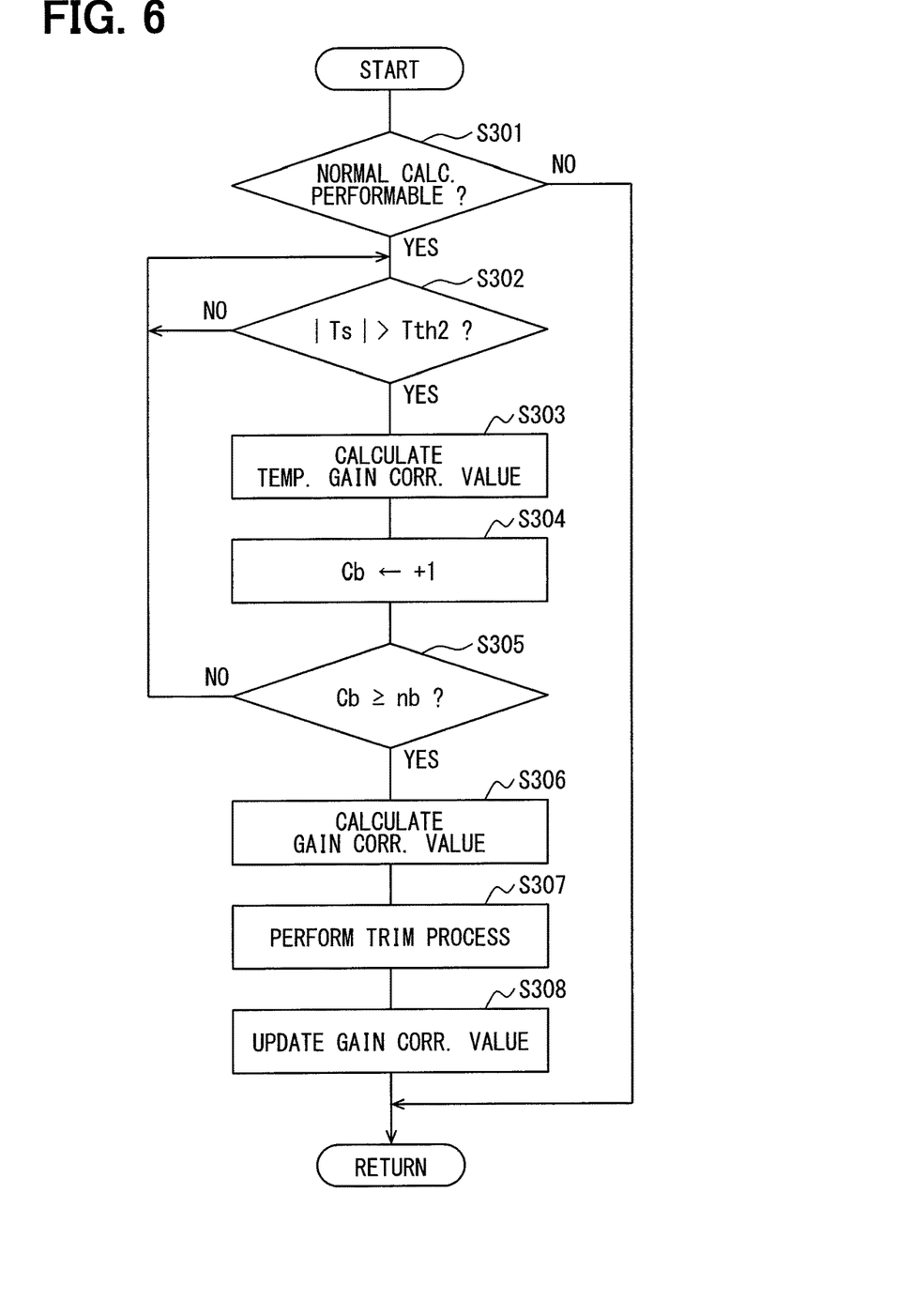
FIG. 6 is a flowchart of a gain correction value calculation process in a third embodiment of the present disclosure.

The third embodiment of the present disclosure is described based on FIG. 6.

In the present embodiment, the gain correcting value B1 is calculated by the correction value calculator 42. The offset correction value A1 may be calculated, just like the first embodiment, at the time of starting of the electric power steering device 80, or may be calculated during the travel of the vehicle, just like the second embodiment, or a value set up in advance may be used as A1.

The gain correction value calculation process in the present embodiment is described based on a flowchart shown in FIG. 6. This process is performed in the ECU 40 during the starting of the electric power steering device 80.

The process of S301 is the same as the process of S201 in FIG. 5. In S302, it is determined whether the correction value calculator 42 has the absolute value of the steering torque Ts greater than a gain calculability threshold Tth2. The gain calculability threshold Tth2 is used, because the error concerning the gain correction is relatively large when the steering torque Ts is small. Therefore, the gain calculability threshold Tth2 is set to a value that makes the error concerning the gain correction substantially allowable.

When it is determined that the absolute value of the steering torque Ts is less than the gain calculability threshold Tth (S302:NO), the present determination process is repeated. In other words, the calculation concerning the gain correcting value B1 is not performed when the steering torque Ts is small, waiting for a chance until the steering torque Ts exceeds the gain calculability threshold Tth2.

When it is determined that the absolute value of the steering torque Ts is greater than the gain calculability threshold Tth2 (S302:YES), the process proceeds to S303.

When an affirmative determination is made in both of S301 and S302, it is considered in the present embodiment that "the calculability condition is satisfied".

In S303, the correction value calculator 42 calculates the temporary gain correcting value B1_t. The temporary gain correcting value B1_t is calculated by an equation (4).

$$B1\_t=(D8-Q0)/(D9-Q0) \qquad \text{Equation (4)}$$

The calculated temporary gain correcting value B1_t is stored in the storage part (not illustrated). The value of the temporary gain correction value B1_t calculated in S303 is kept at least to S306 without being overwritten, i.e., by storing calculation-by-calculation values until the process of S306 is performed.

In S304, the correction value calculator 42 increments a counted value Cb of a gain correction counter.

In S305, the correction value calculator 42 determines whether the counted value Cb is equal to or greater than a number of trials threshold nb. The number of trials threshold nb may be the same value as the number of trials threshold na concerning the counted value Ca of the second embodiment, or may be a different value.

When it is determined that the counted value Cb is less than the number of trials threshold nb (S305:NO), it is considered, i.e., determined, that the number of the trials is insufficient, and returns to S302. When it is determined that the counted value Cb is equal to or greater than the number of trials threshold nb (S305:YES), the process proceeds to S306.

In S306, the correction value calculator 42 calculates the gain correction value B1. In the present embodiment, the average value of the temporary gain correction values B1_t for nb times may be set to the gain correction value B1. Then, the counted value Cb is cleared, and the stored temporary gain correction values B1_t are erased.

In S307, the correction value calculator 42 performs a trim process of the gain correction value B1. Hereafter, the gain correction value calculated in a current cycle of calculation is designated as the calculation value B1(k), and the gain correction value outputted to the control calculator 43 in a previous cycle of calculation is designated as a previous value B1(k−1).

When the absolute value of the current value B1(k) is greater than a gain correction upper limit Bc, the gain correction upper limit Bc or the previous value B1(k−1) is set to the gain correction value B1. In case that the gain correction upper limit Bc is set to the gain correction value B1, the positive/negative sign is taken from the current value B1(k).

When the absolute value of the difference between the current value B1(k) and the previous value B1(k−1) is greater than a gain difference threshold Bd, the previous value B1(k−1) is set to the gain correction value B1.

In S308, the correction value calculator 42 outputs the calculated gain correction value B1 to the control calculator 43. The control calculator 43 obtains the gain correction value B1 from the correction value calculator 42, and updates the gain correction value B1 used for the calculation to the latest value.

In the control calculator 43, by using the gain correction value B1, the first signal value D8 and the second signal value D9 are corrected, and the first post-correction signal value D8_a and the second post-correction signal value D9_a are calculated (see an equation (5-1), and an reference (5-2)).

$$D8\_a=(D8-A1)/B1 \quad \text{Equation (5-1)}$$

$$D9\_a=(D9-A1)/B1 \quad \text{Equation (5-2)}$$

The control calculator 43 performs the torque calculation by using at least one of the post-correction signal values D8_a and D9_a.

The correction value calculator 42 of the present embodiment calculates the gain correction value B1 that corrects the gain error based on the plural signal values D8 and D9 which are equivalent to the detection values, when calculability condition is satisfied. The control calculator 43 performs the calculation by using the signal values D8 and D9 that are corrected with the offset correction value A1 and the gain correction value B1. In the present embodiment, the control calculator 43 calculates the steering torque Ts by using the signal values D8 and D9 that are corrected with the offset correction value A1 and the gain correction value B1.

In the present embodiment, the gain correction value B1 is calculated in view of or according to the aged deterioration and/or the accuracy variation calculates. Thereby, the control calculator 43 can perform the calculation by using the signal values D8 and D9 that are appropriately corrected. Further, the initial correction performed at the time of manufacture is omissible.

The gain correction value B1 is calculated based on a division value that is derived from a division by using the two signal values D8 and D9. More practically, the gain correction value B1 is a division value, i.e., a subtraction value subtracting the zero torque value Q0 from the signal value D8 is divided by another subtraction value subtracting the zero torque value Q0 from the signal value D9. In such manner, the gain correction value B1 is calculable by a relatively easy and simple calculation.

When the steering torque Ts is greater than the gain calculability threshold Tth2, the correction value calculator 42 considers, i.e., determines that the calculability condition concerning the calculation of the gain correction value B1 is satisfied, and calculates the gain correction value B1. In such manner, the gain correction value B1 is calculated according to an ever-changing temperature or the like. Therefore, the signal values D8 and D9 are corrected in an appropriate manner.

The correction value calculation part trims, i.e., restricts, the calculated gain correction value B1, when the absolute value of the calculated gain correction value B1 is greater than the gain correction upper limit Bc, or when the absolute value of the difference of the current value B1(k) and the previous value B1(k−1) is greater than the gain difference threshold Bd. In such manner, a steep change of the gain correction value B1 is prevented and the calculation of an excessive gain correction value B1 is prevented.

Further, the same effects as the above-mentioned embodiment are also achievable.

(Fourth Embodiment)

Figure 7:
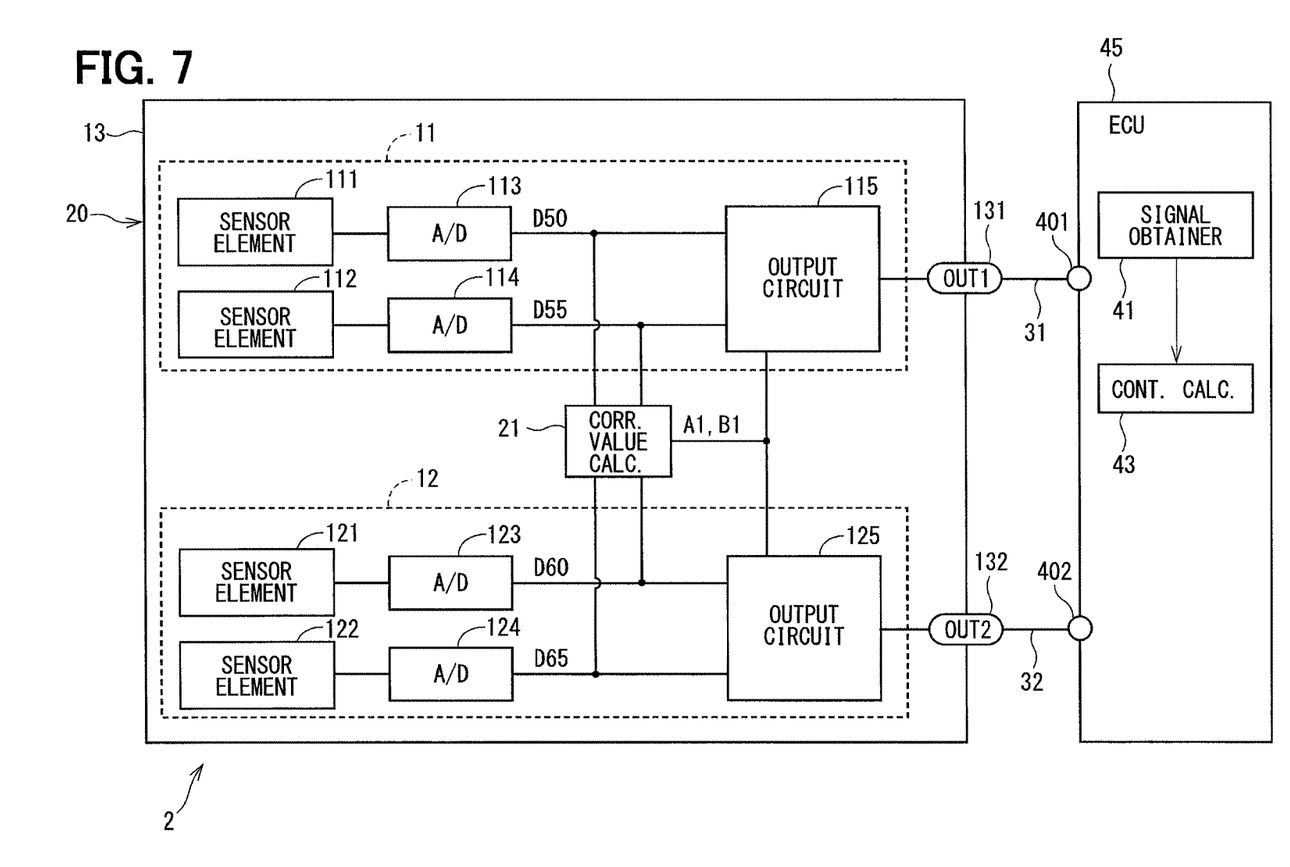
FIG. 7 is a block diagram of the sensor device in a fourth embodiment of the present disclosure.

The fourth embodiment of the present disclosure is described based on FIG. 7.

As shown in FIG. 7, a sensor device 2 of the present embodiment has a sensor part 20 and an ECU 45 that serves as a controller.

In addition to the first signal generator 11 and the second signal generator 12, the sensor part 20 has a correction value calculator 21. Further, the ECU 45 has the signal obtainer 41 and the control calculator 43 just like the above-mentioned embodiment, and the correction value calculator 42 is omitted.

The correction value calculator 21 calculates at least one of the offset correction value A1 and the gain correction value B1. That is, in the present embodiment, the calculation of the correction values A1 and B1 is performed by the sensor part 20.

In FIG. 7, the correction value calculator 21 is shown to be located at a different position from both of the signal generators 11 and 12. However, the correction value calculator 21 may be disposed in one of the signal generators 11 and 12, and may be configured to obtain the information that is required for the calculation of the correction values A1 and B1 from the other.

In the present embodiment, the average value of the first main detection value D50 and the first sub detection value D55 is designated as a first detection value D5, and the average value of the second main detection value D60 and the second sub detection value D65 is designated as a second detection value D6.

The correction value calculator 21 calculates at least one of the offset correction value A1 and the gain correction value B1, based on the first detection value D5 and the second detection value D6.

In the present embodiment, the first detection value D5 and the second detection value D6 respectively correspond to the "detection value equivalent value." Further, the offset correction value A1 and the gain correction value B1 are calculable in the same manner as the above-mentioned embodiments, by replacing the first signal value D8 in the above-mentioned embodiment with the first detection value D5, and by replacing the second signal value D9 in the above-mentioned embodiment with the second detection value D6.

In the calculation of the correction values A1 and B1, whether the calculability condition is satisfied is determined by the correction value calculator 21, by obtaining each of the parameters for such determination from the ECU 45.

Further, whether the calculability condition is satisfied may be determined by the ECU 45, and when a signal indicative of calculability being satisfied is obtained from the ECU 45, the calculation of the correction values A1 and B1 may be performed.

Further, for example, assuming that a voltage supply start time from the ECU 45 is the time of starting of the electric power steering device 80, the offset correction value A1 may be calculated just like the first embodiment.

Further, for example, when a voltage is supplied from the ECU 45, the calculability condition may be considered as being satisfied and the offset correction value A1 and the gain correction value B1 may always be calculated during the operation of the sensor part 10.

The calculated correction values A1 and B1 are outputted to the output circuits 115 and 125. The output circuit 115 corrects the first main detection value D50 and the first sub detection value D55 by the correction values A1 and B1, and generates the first output signal Sd1 by using the corrected value. The output circuit 125 corrects the second main detection value D60 and the second sub detection value D65 by the correction values A1 and B1, and generates the second output signal Sd2 by using the corrected value.

The sensor signal in the output signal Sd1 that is outputted to the ECU 45 and Sd2 is generated based on a value for which at least one of the offset error and the gain error is corrected by the sensor part 20. Thereby, the control calculator 43 can use the value represented by the sensor signal for the calculation, without correcting the offset error or correcting the gain error.

Further, (A) the calculation by using the sensor signal in the output signal Sd1 that includes the detection values D50, D55 corrected by the correction values A1 and B1, and (B) the calculation by using the sensor signal in the output signal Sd2 that includes the detection values D60, D65 corrected by the correction values A1 and B1, are respectively included in a notion of "the calculation by using error corrected values derived from correction of the detection value equivalent value by at least the offset correction value and the gain correction value."

In the present embodiment, the correction value calculator 21 is disposed in the sensor part 20. In such manner, the calculation load of the ECU 45 is reduced.

Further, the same effects as the above-mentioned embodiment are achievable.

(Other Embodiments)

(a) Signal Value, Detection Value

In the first embodiment to the third embodiment, the average value of the first main signal value and the first sub signal value is used as the first signal value, and the average value of the second main signal value and the second sub signal value is used as the second signal value.

However, in other embodiments, the first signal value may be other value other than the average value derived from the averaging of the first main signal value and the first sub signal value, or may be the first main signal itself or the first sub signal itself.

For example, when (i) the main signal and the sub signal are inverted signals from each other and (ii) the sub signal value is not converted to the original signal (i.e., is not inverted), a subtraction value subtracting the first sub signal value from the first main signal value may be used as the first signal value, instead of using the average value of the first main signal value and the first sub signal value.

Similarly, the second signal value may be other value other than the average value of the second main signal and the second sub signal, or may be the second main signal itself or the second sub signal itself.

Further, for example, the correction value calculation in the correction value calculator may be performed by using the average value of the main signal value and the sub signal value as a detection value equivalent value, and the torque calculation in the control calculator may be performed by using the main signal value or the sub signal value as a detection value equivalent value. In other words, the detection value equivalent value used for the correction value calculation and the detection value equivalent value used for the torque calculation may be respectively different values. In addition, in the torque calculation, only one of the first signal value and the second signal value may be used without using the other.

In the fourth embodiment, the average value of the first main detection value and the first sub detection value is used as the first detection value, and the average value of the second main detection value and the second sub detection value is used as the second detection value.

However, in other embodiments, the first detection value may be other value other than the average value of the first main detection value and the first sub detection value, or may be the first main detection value itself or the first sub detection value itself.

Similarly, the second detection value may be other value other than the average value of the second main detection value and the second sub detection value, or may be the second main detection value itself or the second sub detection value itself.

(b) Correction Value Calculator

In the above-mentioned embodiments, the correction value calculator calculates the offset correction value or the gain correction value based on the detection value equivalent value concerning the first signal generator, and the detection value equivalent value concerning the second signal generator.

However, in other embodiments, the correction value calculator may calculate the offset correction value or the gain correction value by using the detection value equivalent value concerning plural sensor elements in the same signal generator. In such case, each of the signal generators may have a correction value calculator.

In the above-mentioned embodiments, the correction value calculator sets a divided-by-2 value of a difference value, i.e., a value which is derived by dividing a difference of the two detection value equivalent values by 2, to the offset correction value.

However, in other embodiments, a subtraction value that is derived from subtracting the detection value equivalent value of the first element from the detection value equivalent value of the first element being second may be set to the offset correction value, and the detection value equivalent value of the first sensor element may always be considered as true, and the detection value equivalent value of the second sensor element may be corrected by the offset correction value.

Such a correction method may be effective, for example, when (a) the detection accuracy of the second sensor element is lower than that of the first sensor element, or (b) the second sensor element is disposed at a position that is structurally more prone to have a larger error (i.e., is disposed at a position away from a center of detection) than the first sensor element.

In the second embodiment, the correction value calculator sets the average value of plural temporary offset correction values as a pre-restriction offset correction value, i.e., an offset correction value before restriction.

However, in other embodiments, the correction value calculator may omit the process of S204 and S205 in FIG. 5, and may set the temporary offset correction value as a pre-restriction offset correction value.

Similarly, the correction value calculator in the third embodiment may also omit the process of S304 and S305 in FIG. 6, and may set the temporary gain correction value as a pre-restriction gain correction value, regarding the calculation of the gain correction value.

In the above-mentioned embodiments, the correction value calculator trims, i.e., restricts, the offset correction value or the gain correction value, when the absolute value of the offset correction value or the absolute value of the gain correction value is greater than a correction upper limit, or when the absolute value of the difference between the current value and the previous value is greater than the difference threshold.

However, in other embodiments, S105 in FIG. 4, S207 in FIG. 5 or S307 in FIG. 6 may be omitted, and the restriction process of the offset correction value or the gain correction value may be omitted. Further, one of the restriction of the upper limit or the restriction and the restriction by the difference with the previous value may be omitted.

In the first embodiment, the offset correction value calculation process is performed every time the electric power steering device is started.

However, in other embodiments, the offset correction value calculation process may be performed at an interval of every predetermined number of startings of the electric power steering device.

In the fourth embodiment, the detection value is corrected in the output circuit in the sensor part, and the output signal is generated by using the corrected value.

However, in other embodiments, the correction value and the detection value may be respectively separately included in the output signal, and the correction by using the correction value may be performed in the controller.

(c) Calculability Condition

In the first embodiment, the calculability condition concerning the calculation of the offset correction value is considered as satisfied when (a) it is the starting time of the electric power steering device, and (b) the steering member is in the neutral position.

However, in other embodiments, in case that a negative determination is made in S101 or S102 in FIG. 4, the determination process of S101 or S102 may be repeated for a predetermined waiting period (e.g., for several seconds), and, upon detecting a satisfaction of the calculability condition during the waiting period, the process after S103 may be performed, i.e., the offset correction value may be calculated. In such case, a period from the starting of the electric power steering device to the end of the waiting period may be considered as "the starting time of the electric power steering device."

In the second embodiment, the correction value calculator performs a traveling-straight determination, i.e., whether the vehicle is traveling a straight path, based on the steered angle of the steering wheel, the rotation angle speed of the steering member or the motor, the steering torque, the vehicle speed, and the yaw rate.

However, in other embodiments, the correction value calculator may make the traveling-straight determination, without using at least one of the vehicle speed or the yaw rate.

Further, the correction value calculator may arbitrarily omit the obtainment of the parameter which is not used for the calculation, and the neutral position determination of the steering member and the traveling-straight determination of the vehicle may be made by other method other than the method described above.

(d) Sensor Part

In the above-mentioned embodiments, the output circuit outputs the output signal to the controller at the predetermined cycle.

However, in other embodiments, a request signal may be outputted to the sensor part from the controller, and the output circuit may output the output signal to the controller when the request signal is detected.

When the request signal is used, the output timing of the output signal may be the same timing among the plural signal generators, or may be different from each other among them.

In the above-mentioned embodiments, the output circuit outputs the output signal to the controller by the SENT communication.

However, in other embodiments, the output circuit may output the output signal to the controller by other digital communications methods other than SENT communication. Further, in other embodiments, the output circuit may output the output signal to the controller by analog communications.

In the above-mentioned embodiments, the main signal is used as the original signal and the sub signal is used as the inverted signal.

However, in other embodiments, the main signal is may be used as the inverted signal, and the sub signal may be used as the original signal, or both of the main signal and the sub signal may not be inverted, i.e., may both be used as-is signals.

In the above-mentioned embodiments, the sensor part has the two signal generators containing the two sensor elements, and a total of four sensor elements are provided in one sensor part.

However, in other embodiments, the sensor element provided in one sensor part may be any number being equal to or greater than two. For example, a signal generator containing one sensor element may be provided two or more in one sensor part, or a signal generator containing two or more sensor elements may be provided, in one sensor part, one or more.

In the above-mentioned embodiments, the two signal generators are sealed in one package by the sealed part.

However, in other embodiments, the sealed part is provided for every signal generator, and the number of packages may be two or more.

The sensor element of the above-mentioned embodiments is a Hall element.

However, in other embodiments, the sensor element may be the magnetism detection elements other than the Hall element, and may detect physical quantity other than the magnetism.

In the above-mentioned embodiments, the sensor part is used as the torque sensor which detects the steering torque.

However, in other embodiments, the sensor part may detect any physical quantity, e.g., a torque other than the steering torque, the rotation angle, the stroke, the load, the pressure or the like.

(e) Sensor Device

In the above-mentioned embodiments, the sensor device is applied to the electric power steering device.

However, in other embodiments, the sensor device may be applied to an in-vehicle device other than electric power steering device, or may be applied to a device which is not disposed in a vehicle.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A sensor device for correcting a torque value of an electric power steering device of a vehicle to correct the torque value to compensate for age deterioration and accuracy variation in the electric power steering device, the sensor device comprising:
   a torque sensor configured to detect a torque applied to a steering component of the vehicle, the torque sensor comprising a sensor part including:
     a first signal generator and a second signal generator, each of the first signal generator and the second signal generator including:
       a pair of magnetic flux sensors configured to detect a magnetic flux value of a magnetic flux collector in the torque sensor;
       a pair of A/D conversion circuits configured to convert the magnetic flux value measured by the pair of magnetic flux sensors to digital values; and
       an output circuit configured to output an output signal based on the digital values and to send the output signal by a digital communication; and
   a controller configured to receive the output signal from the sensor part, the controller including a control calculator configured to calculate a steering torque drive control value, wherein one of the sensor part or the controller includes a correction value calculator configured to:
     calculate a first signal value based on the output signal from the first signal generator;
     calculate a second signal value based on the output signal from the second signal generator;
     calculate at least one of an offset correction value for correcting an offset error in the output signal and a gain correction value for correcting a gain error in the output signal;
     calculate a corrected first signal value based on the first signal value and the offset correction value or the gain correction value; and
     calculate a corrected second signal value based on the second signal value and the offset correction value or the gain correction value in response to a calculability condition being satisfied, and to output the corrected first signal value and the corrected second signal value to the control calculator,
   wherein the control calculator is further configured to update the at least one of the offset correction value and the gain correction value and calculate the steering torque drive control value based on the corrected first signal value and the corrected second signal value and to output the steering torque drive control value to a power steering motor in the electric power steering device such that the power steering motor is controlled according to the steering torque drive control value that is corrected to compensate for age deterioration and accuracy variation in the electric power steering device.

2. The sensor device of claim 1, wherein the offset correction value is calculated based on a subtraction value derived by subtracting one of the first signal value and the second signal value from another of the first signal value and the second signal value.

3. The sensor device of claim 1, wherein the gain correction value is calculated based on a division value derived by dividing one of the first signal value and the second signal value from another of the first signal value and the second signal value.

4. The sensor device of claim 1, wherein the correction value calculator is provided in the controller.

5. The sensor device of claim 1, wherein the correction value calculator is provided in the sensor part.

6. The sensor device of claim 1, wherein the output circuit outputs the output signal to the controller by digital communications.

7. The sensor device of claim 1, wherein the pair of magnetic flux sensors are further configured to detect a change of magnetic flux according to a change of a steering torque applied to a steering shaft in the vehicle power steering system.

8. The sensor device of claim 1, wherein the correction value calculator restricts the calculated offset correction value, when (i) an absolute value of the calculated offset correction value is greater than an upper limit of the offset correction value or (ii) an absolute value of a difference between a current value and a previous value of the calculated offset correction value is greater than an offset difference threshold.

9. The sensor device of claim 1, wherein the correction value calculator restricts the calculated gain correction value, when (i) an absolute value of the calculated gain correction value is greater than an upper limit of the gain correction value or (ii) an absolute value of a difference between a current value and a previous value of the calculated gain correction value is greater than a gain difference threshold value.

10. The sensor device of claim 7, wherein the calculability condition includes (i) the electric power steering device is started and (ii) a steering member is in a neutral position.

11. The sensor device of claim 7, wherein the calculability condition includes the vehicle is traveling a straight path.

12. The sensor device of claim 7, wherein the calculability condition includes the steering torque is greater than a gain calculation threshold.

* * * * *